June 2, 1964
W. A. TOWNROW
3,135,072
TOOL AND TOOL HOLDER ASSEMBLIES FOR LENS SURFACING MACHINES
Filed Dec. 10, 1962
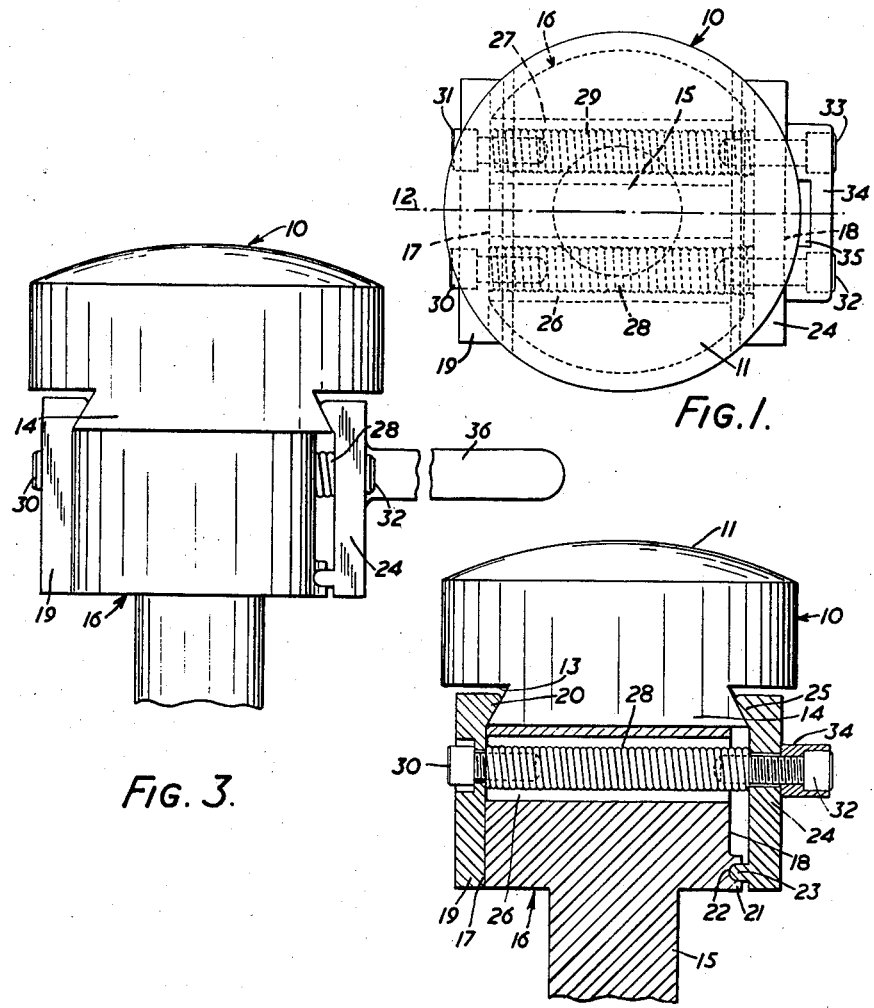
INVENTOR
WILFRED A. TOWNROW
BY Schneider, Dressler,
Goldsmith & Clement
ATTORNEYS US United States Patent Office 3,135,072
Patented June 2, 1964

3,135,072
TOOL AND TOOL HOLDER ASSEMBLIES FOR LENS SURFACING MACHINES
Wilfred Albert Townrow, Woodford Green, England, assignor to Raphaels Limited, London, England, a company of Great Britain
Filed Dec. 10, 1962, Ser. No. 243,225
Claims priority, application Great Britain Dec. 8, 1961
7 Claims. (Cl. 51—211)

This invention relates to tool and tool holder assemblies for lens surfacing machines (i.e. lens grinding or polishing) machines, being assemblies of the kind in which a tool, having a surface the shape of which is the complement of the desired shape of the lens to be ground or polished upon the tool, is detachably mounted upon a fixed holder or base in a detachable manner, so that the tool can easily be removed and replaced by another tool having a surface of different shape. The working environment of the tool and tool holder assembly is highly abrasive because the lens is ground or polished upon the tool utilising an abrasive paste or rouge.

When grinding or polishing lenses it is essential that the tool should be firmly supported so that it cannot move during the grinding or polishing operation. For grinding or polishing cylindrical or toric lenses, the cylindrical axis must be accurately aligned and the alignment must remain true.

It is an object of the invention to provide a simple, robust and reliable tool and tool holder assembly which is less subject to abrasive particles getting lodged between the engaging surfaces than are the known assemblies. Another object is to provide an assembly in which considerable wear can take place without materially reducing the accuracy and firmness with which the tool is held.

According to the present invention an assembly of the kind specified comprises a tool having extending across its back or underside an undercut projection, a tool holder having an undercut groove adapted to receive the said projection, one wall of the groove being fixed and the other being spring biassed towards a position in which it firmly engages the projection of the tool, and means for retracting the latter wall against the bias to release the said projection being spring biassed towards a position in which it firmly engages the projection of the tool, and means for retracting the latter wall against the bias to release the said projection and permit removal and replacement of the tool.

The biassing may be provided by a spring or by equivalent resilient means, for example pneumatic means.

Conveniently, the projection of the tool and the groove in the holder are of dove-tailed form in cross-section, the projection having a flat base which seats upon a corresponding flat surface of the holder which constitutes the bottom of the dove-tailed groove. The sloping sides of the dove-tail urge these surfaces into firm contact with one another, thereby enhancing the rigidity with which the tool is held.

Since one wall of the groove is biassed towards the opposite wall, it automatically takes up any wear on the groove or on the back of the tool, which may be relatively rapid in the highly abrasive environment.

An advantage of the present invention is that it does not rely upon engagement of tapered pins or upon the fit of a pin in a slot to maintain alignment of the axis, since with both those the alignment of the tool and the firmness with which it is held may suffer through abrasive particles getting lodged between the engaging surfaces. Also, such devices are vulnerable to wear and often prove difficult to disengage. Neither does the invention depend upon a vice-like grip realised through an engagement of screw threads, which are also subject to abrasive particles getting between the engaging thread surfaces. They are also liable to corrode and seize up, and are subject to rapid wear.

The invention may be performed in various ways and two specific embodiments will now be described by way of example with reference to the accompanying drawings, in which:

FIGURE 1 is a plan view of one form of tool and tool holder assembly embodying the invention;
FIGURE 2 is an elevation of the embodiment shown in FIGURE 1 with the tool holder in section; and
FIGURE 3 is a view, similar to FIGURE 2, of another embodiment.

In the drawings, equivalent parts of the two embodiments have been given the same reference numerals.

Referring to FIGURES 1 and 2, a tool 10 is shown which has a convex upper surface 11. This surface has a cylindrical or toroidal surface the axis of which lies in a vertical plane denoted by the chain line 12. In operation, a lens is ground or polished by rubbing it repeatedly over the surface 11, a suspension of abrasive paste or rouge being continuously supplied between the lens and the said surface. The under surface of the lens is thereby ground or polished in conformity with the curvature of the surface 11 but in the complementary or concave sense. It is essential for optical accuracy that the surface 11 should not rotate about a vertical axis. On the back or underside 13 of the tool 10 is a projection 14 of dove-tail cross-section.

The tool holder comprises a stem 15 adapted to be rigidly fixed to the lens grinding or polishing machine. On top of the stem and fixed to it or formed in one piece with it is a block 16 having opposite sides 17 and 18 which are perpendicular to the plane 12. To one side 17 is permanently fixed a side plate 19, as by screws (not shown). The upper end of the side plate 19 has a formation 20 which constitutes a fixed side wall of a dove-tail groove which receives the projection 14. At the bottom of the other side 18 of the block 16 is a projection 21 having a semi-cylindrical channel 22 extending for its full length. This channel receives a semi-cylindrical rib 23 formed at the lower end of a movable side plate 24. The upper end of the side plate 24 has a formation 25 which constitutes a movable side wall of the said dove-tail groove.

The block 16 has two transverse bores 26 and 27 which accommodate tension springs 28 and 29, respectively. One end of each spring is fixed to the side plate 19 by a screw 30 or 31, while to the other end of each spring is attached a screw 32 or 33. The screws 32 and 33 also serve to fix a bridge piece 34 to the outer surface of the movable side plate 24. There is a slot 35 between the central portion of the bridge piece 34 and the side plate 24 into which a tool-releasing lever (not shown) can be inserted. The springs 28 and 29 are under initial tension so that they exert a force on the movable side plate 24 tending to turn it in the anti-clockwise direction in FIGURE 2 about the fulcrum constituted by the rib 23 in the channel 22. Thus, when the tool 10 is present as shown in the drawings, the dove-tail projection 14 is firmly gripped between the fixed wall 20 and the spring-biassed movable wall 25.

To release the tool, one end of the tool-releasing lever is inserted in the slot 35 and the lever is moved in the clockwise direction in FIGURE 2, to swing the side plate 24 about its fulcrum 22, 23 in the clockwise direction against the action of the springs 28, 29. Only a slight movement is required to ease the wall 25 away from the dove-tail formation 14 and allow the tool 10 to be slid out of the dove-tail groove in the holder. Another tool can then be inserted. If any abrasive material should collect in the groove before the tool is inserted, insertion of the tool merely pushes the grit out of the groove. However, if some grit still remains this does not matter as the springs afford an adequate grip on the tool when the lever is released. Also even if wear of the dove-tail projection or of the walls of the dove-tail groove should occur, the springs merely move the side plate 24 further in the anti-clockwise direction to take up this wear.

The embodiment shown in FIGURE 3 differs from that shown in FIGURES 1 and 2 only in that instead of having a separate bridge piece and lever, the lever 36 is formed integrally with the movable side plate 24.

What I claim as my invention and desire to secure by Letters Patent is:

1. A lens surfacing tool and tool holder assembly comprising a lens surfacing tool having an obverse side and a reverse side, an undercut projection extending across said reverse side, said obverse side having a complementary lenticular surface configuration; and a tool holder comprising a base, fixed wall means on said base, movable wall means mounted on said base, said fixed wall means and said movable wall means defining therebetween an undercut groove to receive said undercut projection of said tool, resilient means biassing said movable wall means towards said fixed wall means to clamp said projection therebetween and means for retracting said movable wall means against the action of said resilient biassing means to release said projection and permit removal and replacement of said tool.

2. A tool and tool holder assembly according to claim 1 wherein said projection is of uniform cross-section and extends rectilinearly across said reverse side of said tool and said wall means extends rectilinearly in relation to said base and define therebetween a rectilinear groove of uniform cross-section.

3. A tool and tool holder assembly according to claim 1 in which said base of said tool holder has a portion with a flat surface defining a flat bottom of said groove, and said projection of said tool has a flat bottom surface to engage said flat bottom of said groove.

4. A tool and tool holder assembly according to claim 3 in which said projection and said groove are of dove-tail form in cross-section.

5. A tool and tool holder assembly according to claim 1 in which said biassing means is constituted by at least one spring.

6. A tool and tool holder assembly according to claim 1 in which said base of said tool holder has means defining a fulcrum and said tool holder also includes a plate having parallel opposite edge formations, one of said edge formations comprising a pivot in co-operative rockable engagement with said fulcrum formation of said base and the other of said edge formations constituting said movable wall means, said biassing means being in operative engagement with said plate at a point intermediate between said edge formations.

7. A lens surfacing tool and tool holder assembly comprising a lens surfacing tool having an observe side and a reverse side, a rectilinear projection of uniform dove-tail form in cross-section extending across said reverse side, said projection having a flat bottom surface, and said obverse side having a complementary lenticular surface configuration; and a tool holder comprising a base, fulcrum means on said base, fixed wall means on said base, said base also having a portion with a flat surface, a plate having two parallel opposite edge formations, one of said edge formations comprising a pivot in co-operative rockable engagement with said fulcrum means and the other of said edge formations constituting movable wall means, said fixed means and said flat surface of said base portion defining a rectilinear groove of uniform dove-tail form in cross-section to receive said projection of said tool, at least one spring, means attaching said spring to said plate at a point intermediate between said edge formations of said plate to bias said movable wall means towards said fixed wall means pivotally about said fulcrum, and means associated with said plate to retract said movable wall means pivotally about said fulcrum against the action of said spring.

References Cited in the file of this patent

UNITED STATES PATENTS

| 219,391 | Deal | Sept. 9, 1879 |
| 1,212,131 | Coate | Jan. 9, 1917 |
| 1,436,626 | Spaander | Nov. 21, 1922 |
| 2,916,857 | Dargie | Dec. 15, 1959 |

FOREIGN PATENTS

| 434,311 | France | Nov. 22, 1911 |